(12) United States Patent
Miller et al.

(10) Patent No.: US 7,269,303 B2
(45) Date of Patent: Sep. 11, 2007

(54) REMOTE DIGITAL IMAGE ENHANCEMENT SYSTEM AND METHOD

(75) Inventors: David Jeffrey Miller, Camas, WA (US); Jefferson Patrick Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 09/873,222

(22) Filed: Jun. 4, 2001

(65) Prior Publication Data

US 2002/0181012 A1 Dec. 5, 2002

(51) Int. Cl.
- G06K 9/40 (2006.01)
- G06K 9/54 (2006.01)
- G06K 9/60 (2006.01)
- G06F 7/00 (2006.01)
- G06F 17/00 (2006.01)

(52) U.S. Cl. .................. 382/305; 382/254; 382/306; 382/307; 707/7

(58) Field of Classification Search ............... 382/254, 382/305, 306, 307; 707/7
See application file for complete search history.

(56) References Cited

U.S. PATENT DOCUMENTS

| | | | |
|---|---|---|---|
| 5,218,649 A | 6/1993 | Kundu et al. | 382/54 |
| 5,384,862 A * | 1/1995 | Echerer et al. | 382/132 |
| 5,694,484 A | 12/1997 | Cottrell et al. | 382/167 |
| 5,798,764 A | 8/1998 | Akiyama | 345/423 |
| 5,835,627 A | 11/1998 | Higgins et al. | 382/167 |
| 5,990,901 A | 11/1999 | Lawton et al. | 345/429 |
| 6,009,209 A | 12/1999 | Acker et al. | 382/275 |
| 6,016,354 A | 1/2000 | Lin et al. | 382/117 |
| 6,058,190 A | 5/2000 | Cordery et al. | 380/51 |
| 6,072,893 A | 6/2000 | Luo et al. | 382/117 |
| 6,101,000 A | 8/2000 | Murray et al. | 358/1.9 |
| 6,122,069 A | 9/2000 | Kendall et al. | 358/1.9 |
| 6,157,435 A * | 12/2000 | Slater et al. | 355/40 |
| 6,160,923 A | 12/2000 | Lawton et al. | 382/275 |
| 6,166,729 A | 12/2000 | Acosta et al. | 345/327 |
| 6,202,073 B1 * | 3/2001 | Takahashi | 715/517 |
| 6,204,858 B1 | 3/2001 | Gupta | 345/431 |
| 6,208,762 B1 | 3/2001 | Garland et al. | 382/254 |
| 6,324,521 B1 * | 11/2001 | Shiota et al. | 705/27 |
| 6,507,675 B1 * | 1/2003 | Lee et al. | 382/266 |
| 6,640,016 B1 * | 10/2003 | Ito | 382/263 |
| 6,642,956 B1 * | 11/2003 | Safai | 348/222.1 |
| 6,658,167 B1 * | 12/2003 | Lee et al. | 382/305 |
| 6,674,924 B2 * | 1/2004 | Wright et al. | 382/306 |
| 6,829,378 B2 * | 12/2004 | DiFilippo et al. | 382/128 |
| 7,031,965 B1 * | 4/2006 | Moriya et al. | 707/10 |
| 7,082,227 B1 * | 7/2006 | Baum et al. | 382/311 |
| 7,136,528 B2 * | 11/2006 | Edwards et al. | 382/209 |
| 7,218,776 B2 * | 5/2007 | Sowinski et al. | 382/162 |
| 2004/0071369 A1 * | 4/2004 | Onishi | 382/305 |

* cited by examiner

*Primary Examiner*—Matthew C. Bella
*Assistant Examiner*—Wes Tucker

(57) ABSTRACT

A system and method are provided for remotely enhancing digital images by communication of the digital images over a network to a remote processing facility. More particularly, the digital image routing method includes steps of receiving a digital image packet that includes a digital image and a customer preference parameter and transmitting the digital image packet to a remote digital image editing system selected according to the customer preference parameter. In addition, the digital image routing method may include the steps of enhancing the digital image based on the customer preference parameter, and transmitting an enhanced digital image packet that includes an enhanced digital image and an enhancement description packet that describes the enhancements made for each of the digital images.

6 Claims, 10 Drawing Sheets

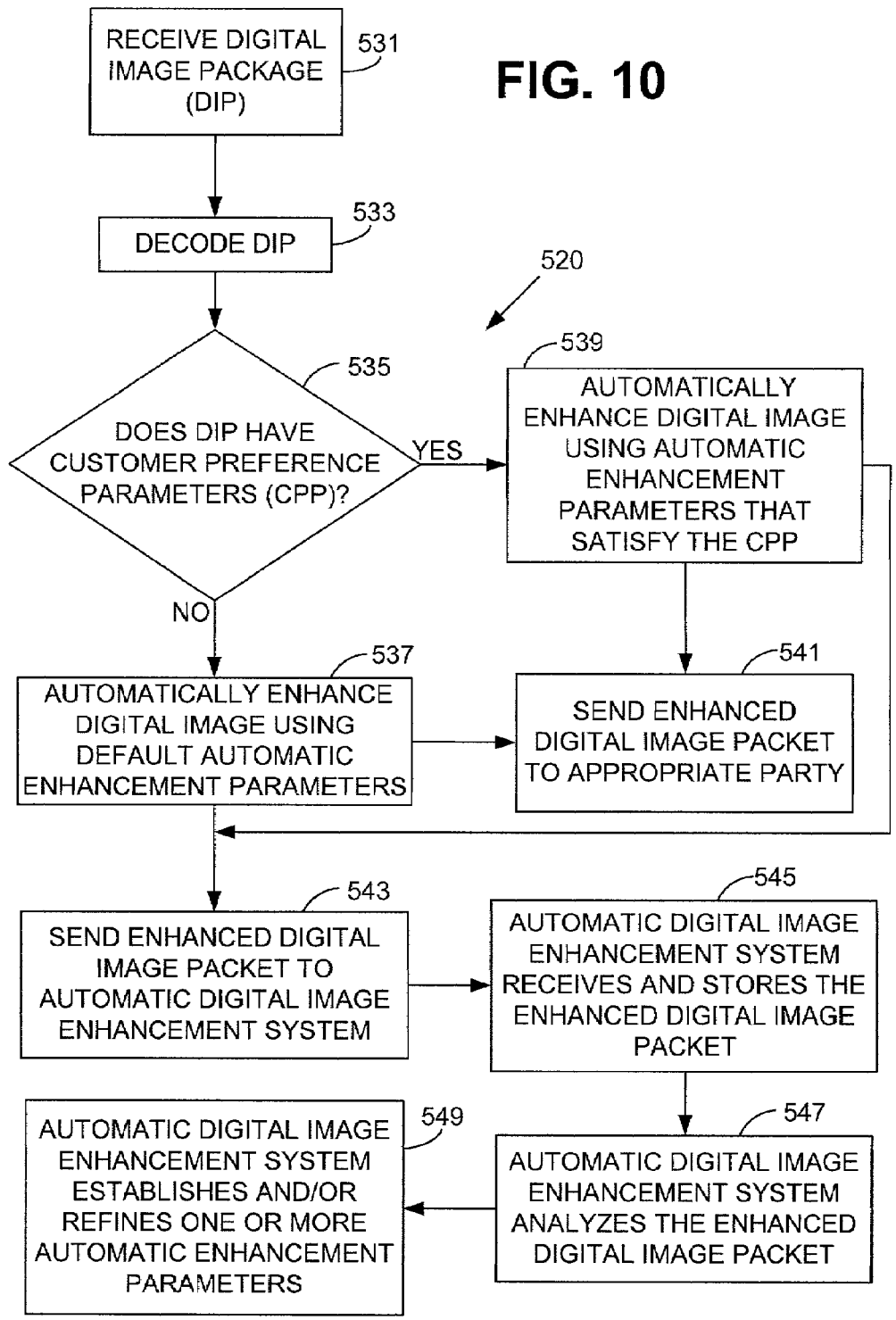

REMOTE DIGITAL IMAGE ENHANCEMENT SYSTEM AND METHOD

TECHNICAL FIELD

The present invention is generally related to digital image processing and, more particularly, to a system and method for remotely enhancing digital images.

BACKGROUND OF THE INVENTION

Digital image processing has become a significant form of image (e.g. photograph, x-ray, video, etc.) processing because of continuing improvements in techniques and the increasing power of hardware devices. Digital image processing techniques have augmented and, in some cases, replaced methods used by photographers in image composition and dark room processing. Moreover, digitized images can be edited with the aid of a computer to achieve a variety of effects such as changing the shapes and colors of objects and forming composite images.

Until recently, real-time editing of digital images was feasible only on expensive, high-performance computer workstations with dedicated, special-purpose, hardware. The progress of integrated circuit technology in recent years has produced microprocessors with significantly improved processing power and has also reduced the costs of computer memories. These developments have made it feasible to implement advanced graphic editing techniques in personal computers. These editing techniques, however, are typically complex and require a technical and/or artistic expertise beyond that of ordinary personal computer user. Furthermore, even if a user could master these editing techniques, most users do not have the time or inclination to edit their digital images. Also, many people want to see and enjoy their digital images soon after the digital images are taken and will spend a significant amount of money to have the digital images edited and printed in a day or even an hour. In addition, many people would like to have overnight processing and editing services with which their digital images can be deposited in the evening and edited digital images received the next morning.

SUMMARY OF THE INVENTION

The present invention provides a system and method for remotely enhancing digital images through transmission of the digital images over a network to a remote processing facility. In one aspect, the invention provides a digital image routing method that includes the steps of receiving a digital image packet that includes a digital image and a customer preference parameter, and transmitting the digital image packet to a remote digital image editing system, selected according to the customer preference parameter. In addition, the digital image routing method may include the steps of enhancing the digital image based on the customer preference parameter, and transmitting an enhanced digital image packet that includes an enhanced digital image and an enhancement description packet that describes the enhancements made for each of the digital images.

In another aspect, the present invention provides a digital image enhancement method that includes the steps of receiving a digital image packet that includes a digital image and a customer preference parameter, enhancing the digital image based on the customer preference parameter, and transmitting an enhanced digital image packet that includes an enhanced digital image and an enhancement description packet that describes the enhancements made for each of the digital images. In addition, the digital image enhancement method may include the step of transmitting the digital image packet to a remote digital image editing system selected according to the customer preference parameter.

In still another aspect, the present invention provides a digital image routing system that is capable of receiving a digital image packet that includes a digital image and a customer preference parameter and transmitting the digital image packet to a remote digital image editing system selected according to the customer preference parameter. In addition, the digital image routing system includes a remote digital image editor system that is capable of enhancing the a digital image based on the customer preference parameter and transmitting an enhanced digital image packet that includes an enhanced digital image and an enhancement description packet that describes the enhancements made for each of the digital images.

In still a further aspect, the present invention provides a digital image routing system that includes a remote digital image editor system that is capable of receiving a digital image packet that includes a digital image and a customer preference parameter, enhancing the digital image based on the customer preference parameter, and transmitting an enhanced digital image packet that includes a enhanced digital image and an enhancement description packet that describes the enhancements made for each of the digital images. In addition, the digital image routing system is capable of transmitting the digital image packet to a remote digital image editing system selected according to the customer preference parameter.

Other systems, methods, features, and advantages of the present invention will be or become apparent to one with skill in the art upon examination of the following drawings and detailed description. It is intended that all such additional systems, methods, features, and advantages be included within this description, be within the scope of the present invention and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10 is a flow chart of the remote digital image editor system program shown in FIG. 9.

DETAILED DESCRIPTION

Embodiments of the present invention provide systems and methods for remotely enhancing digital images through transmissions of the digital images over a network to a remote processing facility. Generally speaking, the digital images comprise part of a digital image packet that includes customer instructions (customer preference parameters) to be performed on one or more of the digital images included in the digital image packet, as well as other customer information. Digital images include, for example, but not limited to, still images, moving images, photographs, video, medical images, etc. The digital image packet is transmitted to a remotely located editor that is skilled in enhancing digital images via the network. The digital images are enhanced according to the customer instructions by the remote editor (automatically or manually), and then are transmitted back to the customer.

Figure 1:
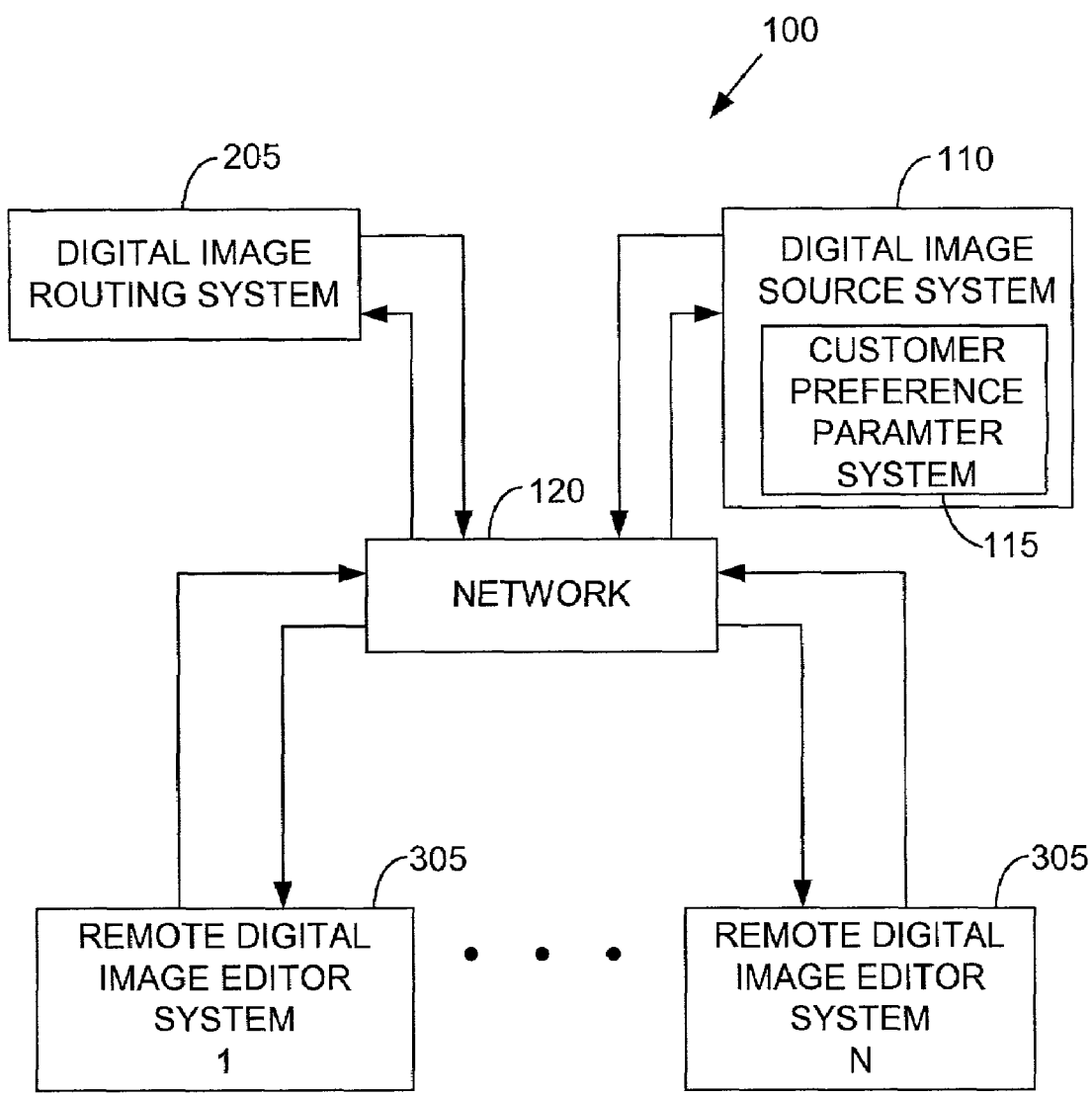
FIG. 1 is a block diagram of a remote digital image processing system.

FIG. 1 illustrates a block diagram of an overview of an embodiment of the remote digital image processing system 100. The remote digital image processing system 100 includes a digital image source 110, a digital image routing system 205, a plurality of remote digital image editor systems 305, and a network 120. The network 120 communicatively couples the digital image source 110, digital image routing system 205, and a plurality of remote digital image editor systems 305 with one another. The network 120 can include, for example, but not limited to, a public switched telephone network (PSTN), the Internet, cellular network, asynchronous transfer mode (ATM), local area network (LAN), wide area network (WAN), or combinations thereof.

As illustrated in FIG. 1, the digital image source 110 is communicatively coupled to the network 120 and, therefore, is capable of transmitting a digital image packet to the digital image routing system 205. The digital image source system 110, can include, for example, but not limited to, a customer, photo lab, or other source that is capable of transmitting a digital image packet. The digital image packet can include, but is not limited to, one or more digital images, one or more customer preference parameters, customer information (e.g. customer geographic location, common enhancements performed on previous orders, customer default customer preference parameters, etc.) and any other appropriate information. The customer preference parameters can include, for example, but not limited to, a preferred editor parameter, parameters that indicate instructions for one or more enhancements to be performed on the digital images, parameters that indicate instructions for one or more enhancements to be performed on one or more particular digital images, cost parameter, return time parameter, editor skill ranking parameter, digital image photo-album parameter (e.g. used to organize digital images into a photo album with a particular theme), caption parameters (e.g. used to select captions to be placed upon one or more digital images), music parameters (e.g. used to select music to be added to the digital image such as a video with music in the background), etc. In an embodiment, the customer is capable of selecting a customer preference parameter that instructs the editor to enhance the digital image as the editor deems necessary (e.g. according to default guidelines). The customer preference parameters can be selected via a program, web page, or other appropriate customer preference parameter selection system 115. In addition, the digital image packet can be updated to include, for example, but not limited to, common enhancements performed on previous orders, default customer preference parameters, etc. The update can be performed by the digital image source system 110, customer preference parameter system 115, the digital image routing system 205, remote digital image editor system 305, or other appropriate system.

Once the digital image routing system 205 receives the digital image packet, the digital image routing system 205 can determine, based upon the received customer preference parameters, the appropriate remote digital image editor system 305 to which to transmit the digital image packet via the network 120. In particular, the digital image routing system 205 analyzes the customer preference parameters to determine which of a plurality of a remote digital image editor systems 305 is best suited to enhance the digital images included in the digital image packet in accordance with the customer's preferences. Then, the digital image routing system 205 transmits the digital image packet to the appropriate remote digital image editor system 305. The digital image packet is decoded, if necessary, and the digitized images are enhanced according to the customer preference parameters by the editor located at the remote digital image editor system 305. Enhancements can include, for example, but are not limited to, editing of a digital image or group of digital images, organizing one or more digital images into a photo album with a particular theme, organizing a video digital image by removing particular segments of the video digital image, organizing one or more digital images to include captions and/or music, etc. After the digital images are enhanced, the remote digital image editor system 305 transmits an enhanced digital image package to the appropriate party via the network 120.

Figure 2:
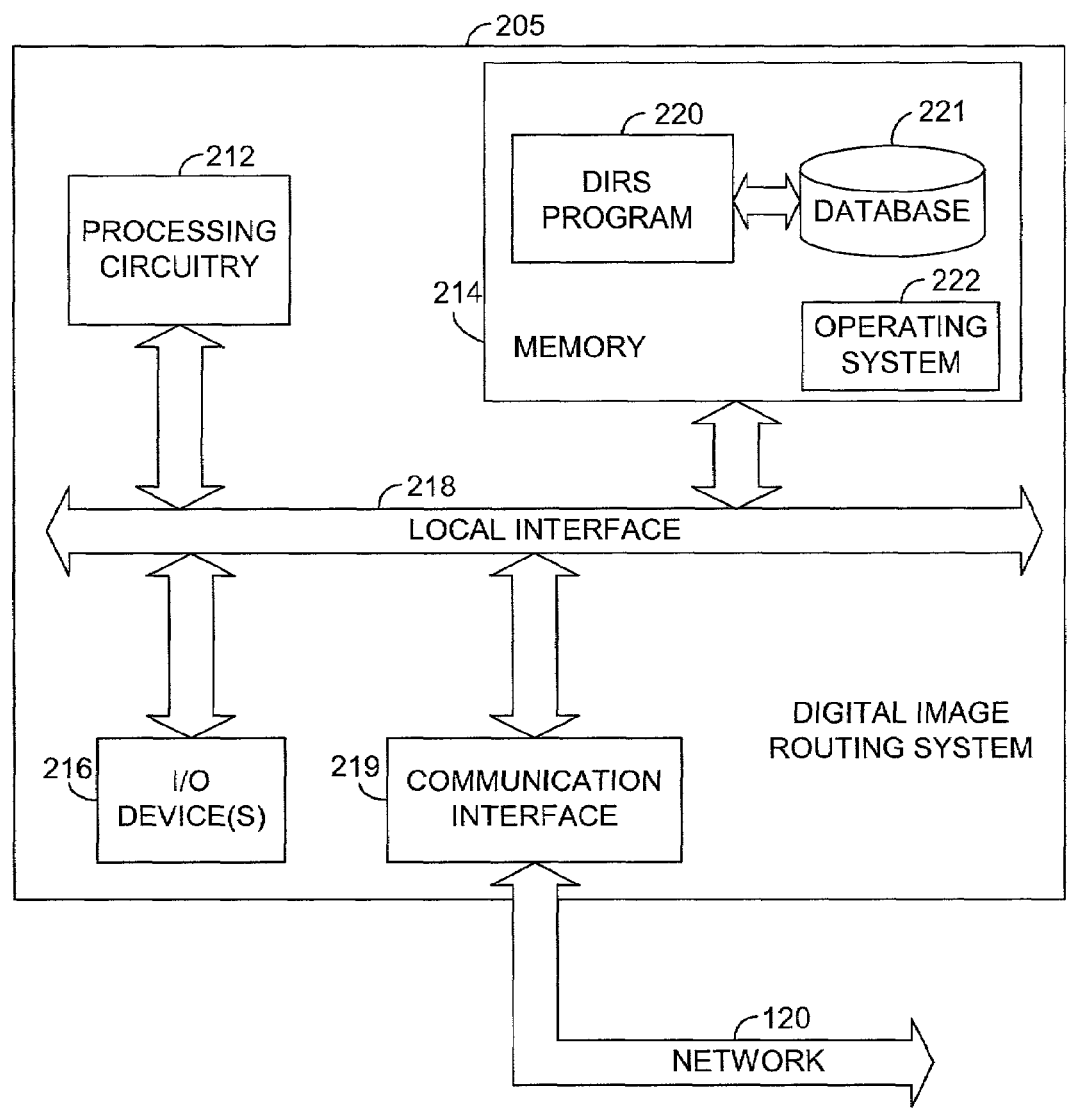
FIG. 2 is a block diagram of the digital image routing system shown in FIG. 1.

The digital image routing system 205 can be implemented in a computer system illustrated in FIG. 2 that is capable of communicatively coupling with the network 120. As indicated in FIG. 2, the digital image routing system 205 includes a digital image routing system program 220 (DIRS program 220) that can be implemented in software, firmware, hardware, or a combination thereof. The DIRS program 220 can be implemented in an executable program, and can be executed by a special or general purpose digital computer, such as a personal computer (PC; IBM-compatible, Apple-compatible, or otherwise), workstation, minicomputer, or mainframe computer. An example of a general purpose computer that can implement the DIRS program 220 of the remote digital image processing system 100 is shown in FIG. 2.

Generally, in terms of hardware architecture, the digital image routing system 205 includes a processor 212, memory 214, and one or more input and/or output (I/O) devices 216 that are communicatively coupled via a local interface 218. The local interface 218 can be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface 218 may include address, control, and/or data connections to enable appropriate communications among the aforementioned components. The local interface 218 is communicatively coupled to a communication interface 219 that functions to communicatively couple with the network 120.

The processor 212 is a hardware device for executing software stored in memory 214. The processor 212 can be any custom made or commercially available processor, a central processing unit (CPU) or an auxiliary processor among several processors associated with the digital image routing system 205, and a semiconductor based microprocessor (in the form of a microchip) or a macroprocessor. Examples of suitable commercially available microprocessors include: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 214 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the processor 212.

The software in memory 214 may include one or more separate programs, each of which comprises an ordered listing of executable instructions for implementing logical functions. In the example of FIG. 2, the software in the memory 214 includes, but is not limited to, DIRS program 220, a database 221, and a suitable operating system (O/S) 222. A nonexhaustive list of examples of suitable commercially available operating systems 222 is as follows: a Windows™ operating system from Microsoft Corporation, a Netware™ operating system available from Novell, Inc., or a UNIX™ operating system, which is available for purchase from many vendors, such as Hewlett-Packard Company, Sun Microsystems, Inc., and AT&T Corporation. The operating system 222 controls the execution of other computer programs, such as the DIRS program 220, and provides scheduling, input-output control, file and data management, memory management, and communication control and related services.

The DIRS program 220 can be a source program, executable program (object code), script, or any other entity comprising a set of instructions to be performed. When a source program, then the program needs to be translated via a compiler, assembler, interpreter, or the like, which may or may not be included within the memory 214, so as to operate properly in connection with the O/S 222. Furthermore, the DIRS program 220 can be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 216 may include input devices, for example but not limited to, a keyboard, mouse, scanner, microphone, etc. Furthermore, the I/O devices 216 may also include output devices, for example but not limited to, a printer, display, etc. The communication interface 219 may include devices that communicate both inputs and outputs, for instance but not limited to, a modulator/demodulator (modem; for accessing another device, system, or network), a radio frequency (RF) or other transceiver, a telephonic interface, a bridge, a router, etc.

If the digital image routing system 205 is a PC, workstation, or the like, the software in the memory 214 may further include a basic input output system (BIOS) (omitted for simplicity). The BIOS is a set of essential software routines that initialize and test hardware at startup, start the O/S 222, and support the transfer of data among the hardware devices. The BIOS is stored in ROM so that the BIOS can be executed when the digital image routing system 205 is activated.

When the digital image routing system 205 is in operation, the processor 212 is configured to execute software stored within the memory 214, to communicate data to and from the memory 214, and to generally control operations of the digital image routing system 205 pursuant to the software. The DIRS program 220 and the O/S 222, in whole or in part, but typically the latter, are read by the processor 212, perhaps buffered within the processor 212, and then executed.

When the DIRS program 220 is implemented in software, as is shown in FIG. 2, it should be noted that the DIRS program 220 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The DIRS program 220 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the DIRS program 220 can be implemented in hardware, the DIRS program 220 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
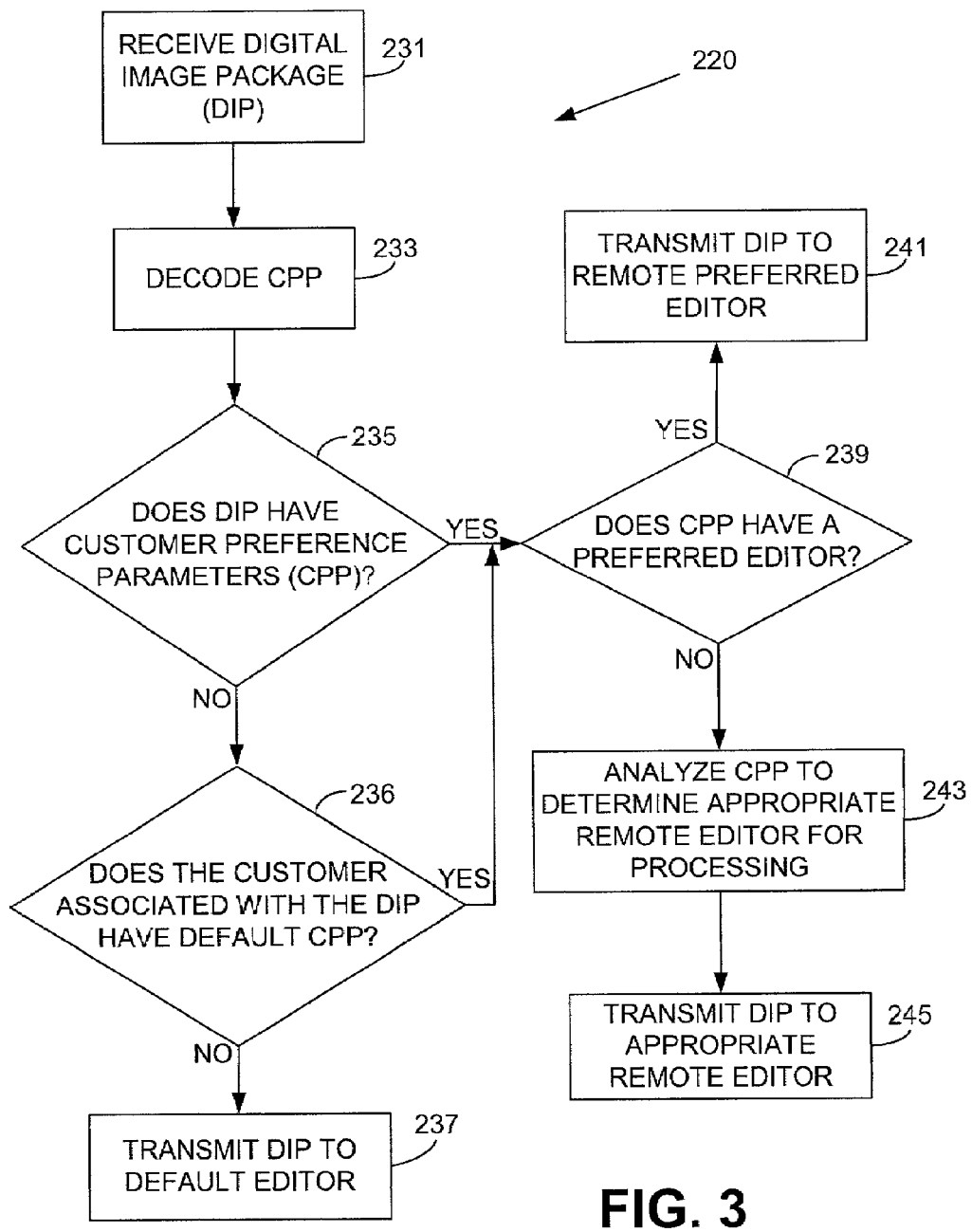
FIG. 3 is a flow chart of the digital image routing system program shown in FIG. 2.

In general, the DIRS program 220 is designed to implement functions such as, but not limited to, receiving digital image packets, updating digital image packets, determining one of a plurality of remote digital image editor systems 305 that is appropriate to enhance the digital images of the digital image packet (as determined by the customer preference parameters selected by the customer), and transmitting the digital image packet to the appropriate remote digital image editor system 305. FIG. 3 illustrates an example of an operation of the DIRS program 220. The DIRS program 220 receives the digital image packet (DIP), as shown in block 231, and then decodes the customer preference parameters (CPP) of the DIP, as shown in block 233. The decoding process involves using stored information in the database 221 to determine the meaning of the CPP. Block 235 is a decisional block where the DIRS program 220 determines if the DIP has a CPP. If the determination in block 235 is "no," then the DIRS program determines if the customer associated with the DIP has a default CPP from a previous DIP, as shown in block 236. If the determination in block 236 is "yes," then the flow chart flows to block 239, discussed below. If the determination is "no," then the DIRS program 220 transmits the DIP to the remote digital image editor system 305 of the default remote editor, as shown in block 237. Alternatively, the DIRS program 220 is capable of requesting that the DIP sender select appropriate customer preference parameters (not shown). If the determination in blocks 235 or 236 is "yes," then the DIRS program 220 determines, in block 239, if the customer preference parameter includes a preferred editor. If the determination in block 239 is "yes," then the DIP is transmitted to the remote digital image editor system 305 of the remote preferred editor, as indicated in block 241. If the determination in block 239 is "no," then the DIRS program 220 analyzes the CPP to determine the appropriate remote editor for processing the DIP, as shown in block 243. Thereafter, the DIRS program 220 transmits the DIP to the appropriate remote digital image editor system 305 of the remote editor, as shown in block 245.

Figure 4:
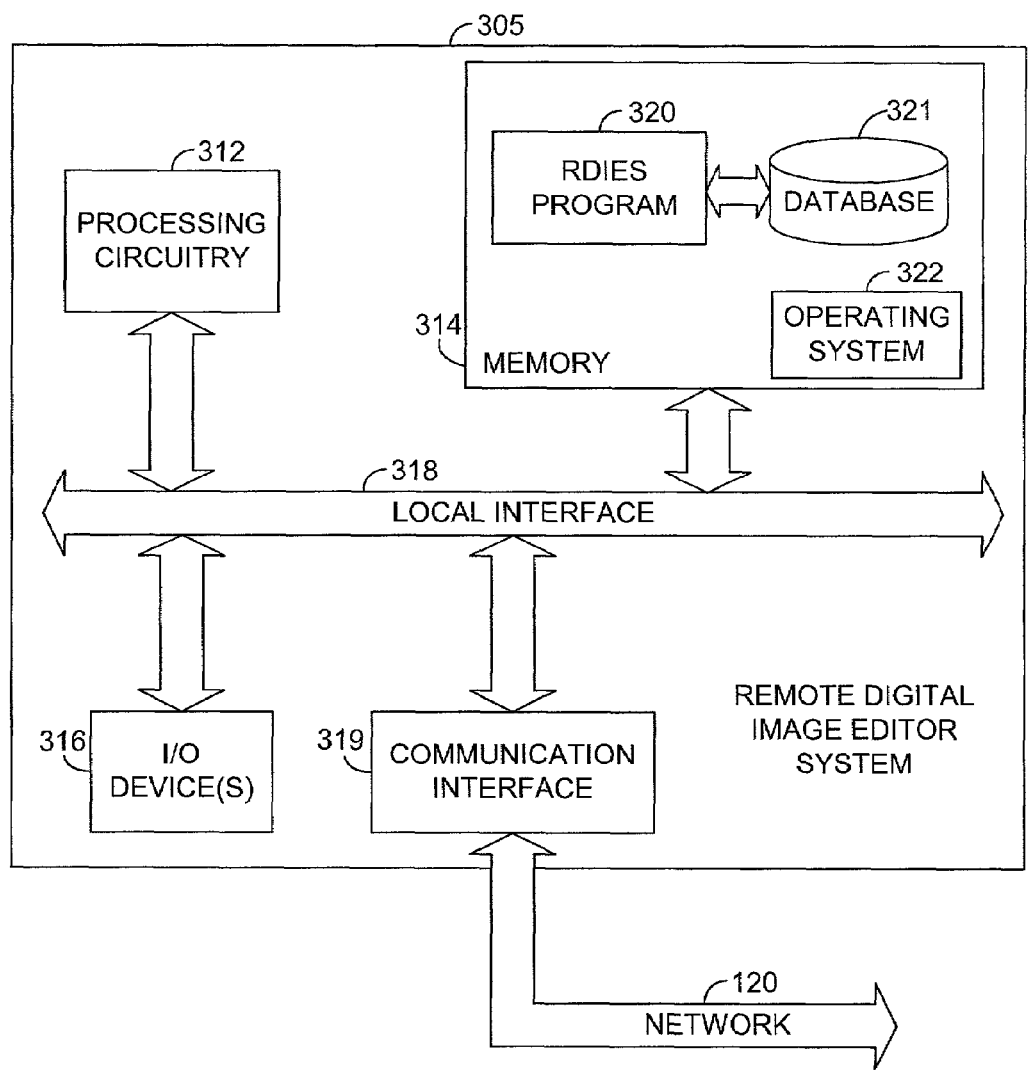
FIG. 4 is a block diagram of the remote digital image editor system shown in FIG. 1.

The remote digital image editor system 305 can be implemented in a computer system, as illustrated in FIG. 4, that is capable of communicatively coupling with the network 120. The remote digital image editor system 305 includes a remote digital image editor system program 320 (RDIES program) that can be implemented in software, firmware, hardware, or a combination thereof. The RDIES program 320 can be implemented in an executable program, and can executed by a special or general purpose digital computer, such as a personal computer (PC; IBM-compatible, Apple-compatible, or otherwise), workstation, minicomputer, or mainframe computer. An example of a general purpose computer that can implement the RDIES program 320 of the remote digital image processing system 100 is shown in FIG. 4.

Generally, in terms of hardware architecture the remote digital image editor system 320 includes a processor 312, memory 314, and one or more input and/or output (I/O) devices 316 that are communicatively coupled via a local interface 318. The local interface 318 can be, for example but not limited to, one or more buses or other wired or wireless connections, as is known in the art. The local interface 318 may have additional elements, which are omitted for simplicity, such as controllers, buffers (caches), drivers, repeaters, and receivers, to enable communications. Further, the local interface 318 may include address, control, and/or data connections to enable appropriate communications among the aforementioned components. The local interface 318 is communicatively coupled to a communication interface 319 that functions to communicatively couple with the network 120.

The processor 312 is a hardware device for executing software that can be stored in memory 314. The processor 312 can be any custom made or commercially available processor, a central processing unit (CPU) or an auxiliary processor among several processors associated with the remote digital image editor system 320, and a semiconductor based microprocessor (in the form of a microchip) or a macroprocessor. Examples of suitable commercially available microprocessors include: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 314 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 314 may incorporate electronic, magnetic, optical, and/or other types of storage media. Note that the memory 314 can have a distributed architecture, where various components are situated remote from one another, but can be accessed by the processor 312.

The software in memory 314 may include one or more separate programs, each of which comprises an ordered listing of executable instructions for implementing logical functions. In the example of FIG. 3, the software in the memory 314 includes programs such as, but is not limited to, RDIES program 320, a database 321, and a suitable operating system (O/S) 322. A nonexhaustive list of examples of suitable commercially available operating systems 322 is as follows: a Windows™ operating system from Microsoft Corporation, a Netware™ operating system available from Novell, Inc., or a UNIX™ operating system, which is available for purchase from many vendors, such as Hewlett-Packard Company, Sun Microsystems, Inc., and AT&T Corporation. The operating system e22 controls the execution of other computer programs, such as the RDIES program 320, and provides scheduling, input-output control, file and data management, memory management, and communication control and related services.

The RDIES program 320 can be a source program, executable program (object code), script, or any other entity comprising a set of instructions to be performed. When a source program, then the program needs to be translated via a compiler, assembler, interpreter, or the like, which may or may not be included within the memory 314, so as to operate properly in connection with the O/S 322. Furthermore, the remote digital image editor system programs 326 can be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 316 may include input devices, for example but not limited to, a keyboard, mouse, scanner, microphone, etc. Furthermore, the I/O devices 316 may also include output devices, for example but not limited to, a printer, display, etc. The communication interface 319 may include devices that communicate both inputs and outputs, for instance but not limited to, a modulator/demodulator (modem; for accessing another device, system, or network), a radio frequency (RF) or other transceiver, a telephonic interface, a bridge, a router, etc.

If the remote digital image editor system 320 is a PC, workstation, or the like, the software in the memory 314 may further include a basic input output system (BIOS) (omitted for simplicity). The BIOS is a set of essential software routines that initialize and test hardware at startup, start the O/S 322, and support the transfer of data among the hardware devices. The BIOS is stored in ROM so that the BIOS can be executed when the remote digital image editor system 320 is activated.

When the remote digital image editor system 320 is in operation, the processor 312 is configured to execute software stored within the memory 314, to communicate data to and from the memory 314, and to generally control operations of the remote digital image editor system 320 pursuant to the software. The RDIES program 320 and the O/S 322, in whole or in part, but typically the latter, are read by the processor 312, perhaps buffered within the processor 312, and then executed.

When the RDIES program 320 is implemented in software, as is shown in FIG. 3, it should be noted that the RDIES program 320 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The RDIES program 320 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the RDIES program 320 can be implemented in hardware, the RDIES program 320 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
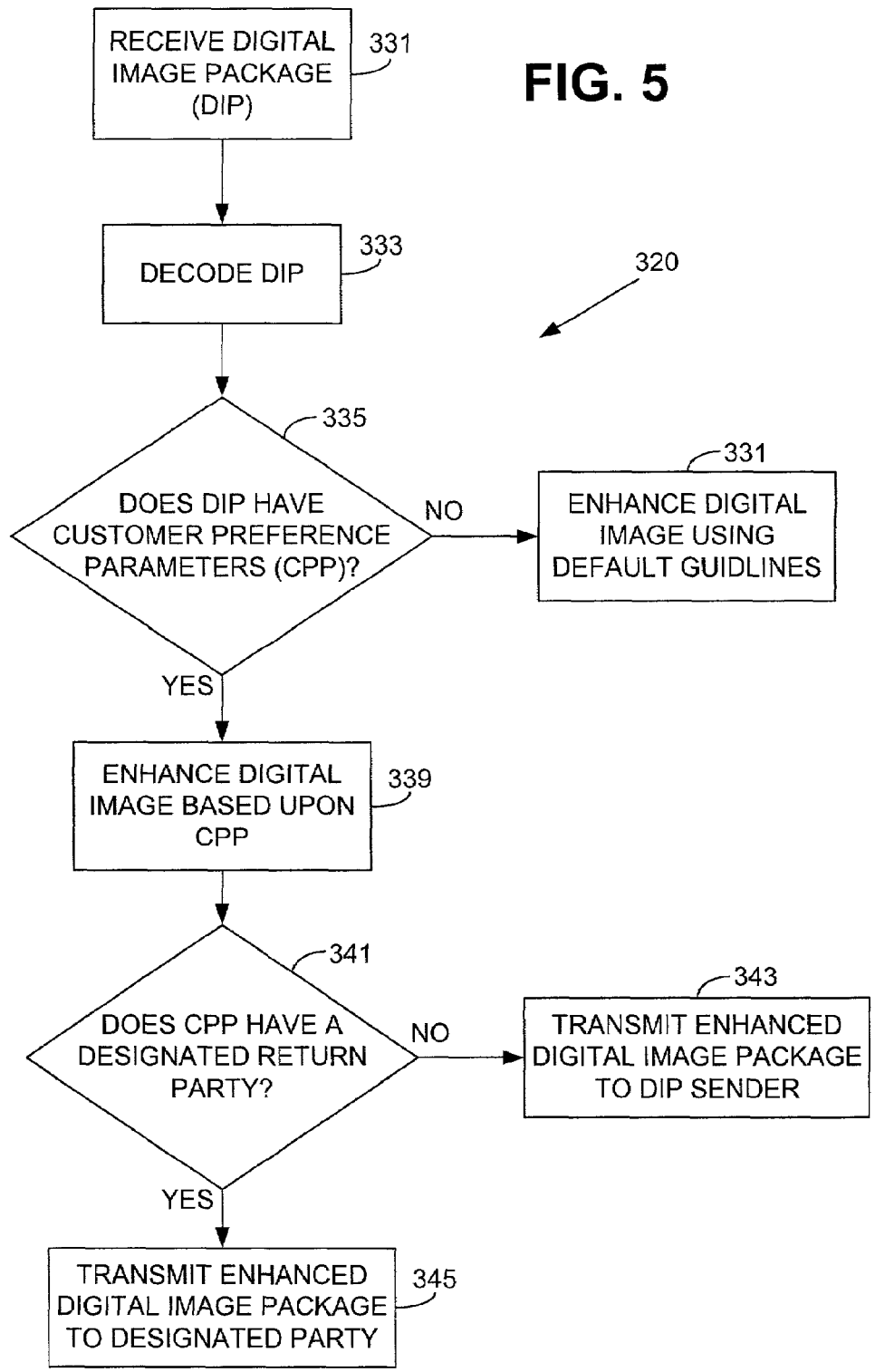
FIG. 5 is a flow chart of the remote digital image editor system program shown in FIG. 4.

Generally, the RDIES program 320 is designed to function for receiving a DIP, determining enhancements to be performed on one or more digital images based upon the CPP, and transmitting an enhanced digital image packet back to the appropriate party (e.g. the sender or other designated party). FIG. 5 illustrates an example of operation of the RDIES program 320. Initially, the RDIES program 320 of the remote digital image editor system 305 receives the DIP, as shown in block 331. Then, the RDIES program 320 decodes the DIP, as shown in block 333. Through decoding, it can be determined whether the DIP includes parameters such as, but not limited to, the CPP, digital image, and other information necessary to remotely process digital images. The decoding process can involve using stored information in the database 321 to determine the meaning of the DIP and CPP. In addition, the database 321 can include, for example, but not limited to, one or more default CPP, prior DIPs, etc. After the DIP is decoded, the RDIES program 320 determines, as shown in decisional block 335, if the DIP includes a CPP or default CPP. If the determination in block 335 is "no," then the RDIES program 320 instructs the editor to enhance the digital image using default guidelines, as indicated in block 331 (or default CPP, if available). The default guidelines provide directions to enhance digital images for basic digital image problems. More particularly, the default guidelines can include, but are not limited to, guidelines enhancing the digital image by correcting for red-eye, sharpness, color, off-center, or crooked and enhancing the digital image by lightening underexposed digital images, darkening overexposed digital images, removing flash reflections, or removing background distractions, etc. Alternatively, the RDIRS program 320 is capable of requesting or instructing the editor to request that the digital image packet sender select appropriate customer preference parameters that include instructions of how to enhance the digital images (not shown).

If the determination in block 335 is "yes," then the digital images are enhanced by the editor based upon the CPP. The enhancement can include, but is not limited to, enhancing the digital image by correcting for red-eye, sharpness, color, off-center, or crooked and enhancing the digital image by lightening underexposed digital images, darkening overexposed digital images, removing flash reflections, or removing background distractions, etc.

Thereafter, the RDIRS program 320 determines, as shown in block 341, if the CPP includes a parameter that identifies a designated return party to transmit the enhanced digital image packet. The enhanced digital image packet can include, but is not limited to, the enhanced digital images, original (unenhanced) digital images, enhancements performed on the digital images (e.g. enhancement description packet), etc. If the determination in block 341 is "no," then the enhanced digital image packet is transmitted to the DIP sender, as indicated in block 343. If the determination is "yes," then the enhanced digital image packet is transmitted to the designated party, as indicated by the CPP and shown in block 345. The designated party can include, but is not limited to, the digital image owner, family member or friend of the digital image owner, digital image sender (e.g. a photo lab) company, news organization, publishing company, etc.

Figure 6:
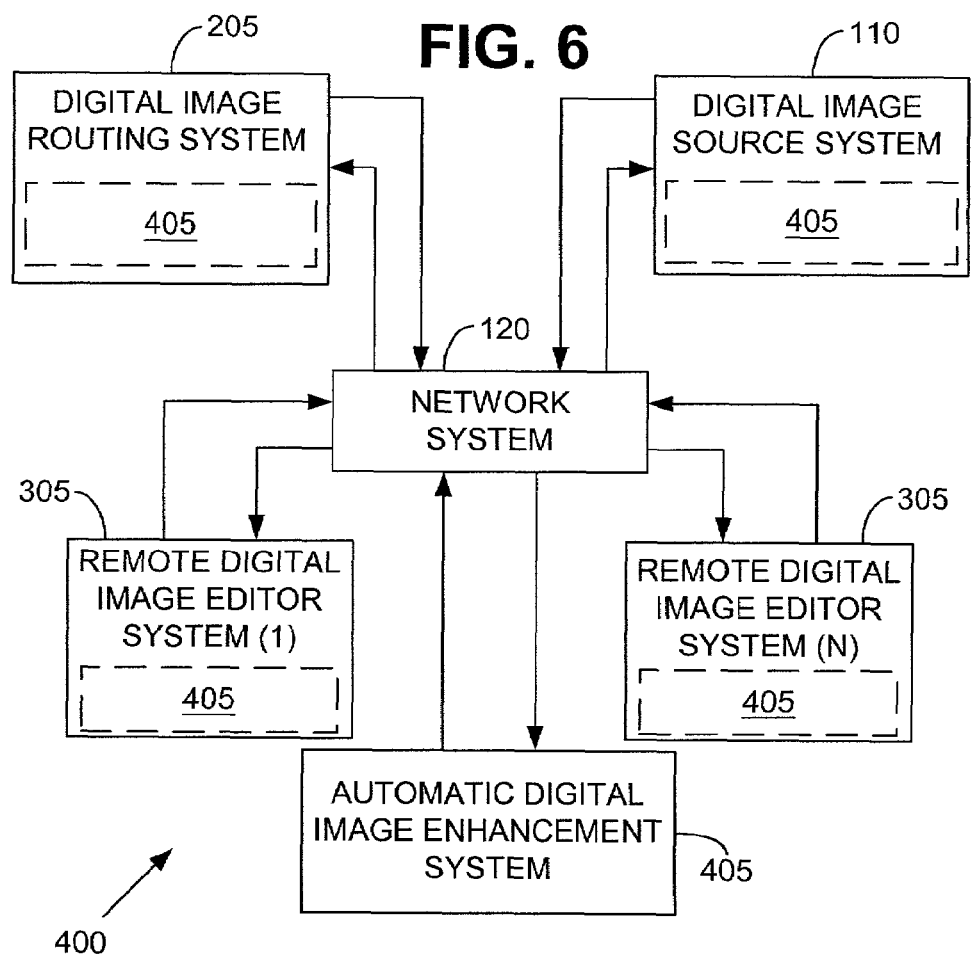
FIG. 6 is a block diagram of the remote digital image processing system of FIG. 1, which includes automatic digital image enhancement.

FIG. 6 illustrates another embodiment 400 of the remote digital image processing system that includes an automatic digital image enhancement system 405. The remote digital image processing system 400 includes, but is not limited to, a digital image source 110, a digital image routing system 205, a plurality of remote digital image editor systems 305, an automatic digital image enhancement system 405, and the network 120. The network 120 communicatively couples the digital image source 110, digital image routing system 205, a plurality of remote digital image editor systems 305, and the automatic digital image enhancement system 405 with one another. The automatic digital image enhancement system 405 can be a distinct system separate from the digital image routing system 205 and remote digital image editor system 305 (as shown by as solid block 405 in FIG. 6) or may be included as part of the digital image routing system 205 and/or remote digital image editor system 305 (as shown by dashed lines in FIG. 6), or a combination of both.

In FIG. 6 the digital image source 110 is communicatively coupled to the network 120 and therefore, is capable of transmitting a DIP to the digital image routing system 205. The DIP can include, but is not limited to, one or more digital images, CPP, geographic location of customer and other information necessary to remotely process digital images as described previously. Once the digital image routing system 205 receives the DIP, the digital image routing system 205 is capable of determining, based upon the CPP, the appropriate remote digital image editor system 305 to transmit the DIP to via the network 120. The digital image routing system 205 analyzes the CPP to determine which of a plurality of a remote digital image editor systems 305 is best-suited to enhance the digital images included in the DIP.

In the event that the DIP contains digital images that qualify for automatic enhancement, the DIP can be automatically enhanced by an automatic digital image enhancement system 405. The automatic digital image enhancement system 405 can be included in the digital image routing system 205, remote digital image editor system 304, be an independent system 405, or a combination of two or more. If the automatic digital image enhancement system 405 is not included in the remote digital image editor system 305, then the qualified digital images can be automatically enhanced and the automatic digital image enhancement system 405 can transmit the automatic enhanced digital image packet to the appropriate remote digital image editor system 205, where the editor located at the remote digital image editor system 205 can approve or disapprove of the automatic enhancements. Alternatively, the automatic digital image enhancement system 405 is capable of sending the automatic enhanced digital image packet to the sending party or other appropriate party, as described previously, if all the digital images were automatically enhanced and no further action is necessary on the part of the editor located at the remote digital image editor system 205.

If the automatic digital image enhancement system 405 is included in the remote digital image editor system 305, then the automatic digital image enhancement system 405 is capable of transmitting the automatic enhanced digital image packet to the appropriate party if all the digital images were automatically enhanced to a satisfactory threshold level and did not require further enhancement. If one or more digital images were not automatically enhanced or require further enhancement, then the automatic digital image enhancement system 405 is capable of transmitting the automatic enhanced digital image packet to the appropriate remote digital image editor system 305. Alternatively, the automatic enhanced digital image packet is reviewed by the editor located at the remote digital image editor system to determine if the automatic enhancements are satisfactorily performed. If the automatic enhancements are satisfactory, then the editor can approve the automatic enhancements and perform any other enhancements, if necessary. If the automatic enhancements are not satisfactory, then the editor can retract the automatic enhancements and manually enhance the digital image.

Figure 7:
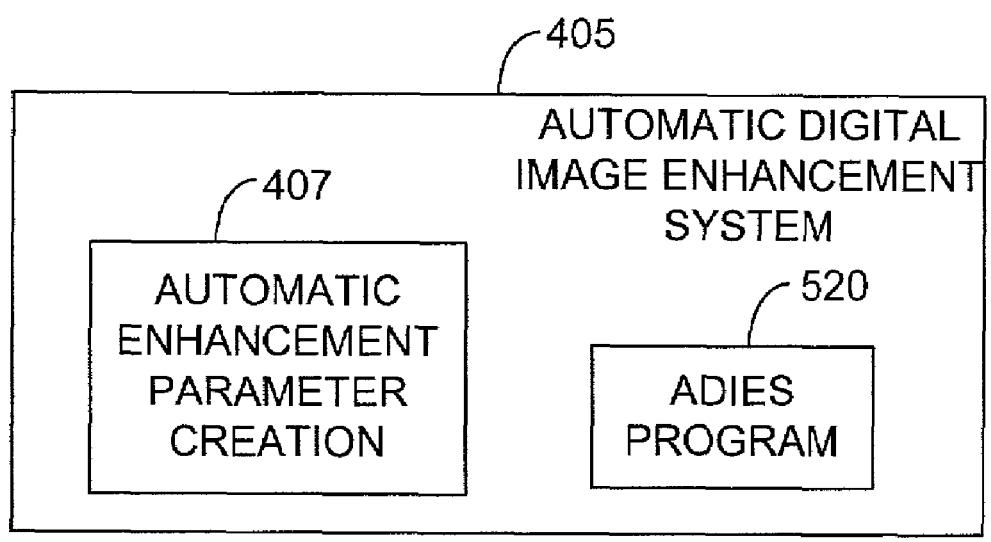
FIG. 7 is a block diagram of the modules of the automatic digital image enhancement system shown in FIG. 6.
Figure 8:
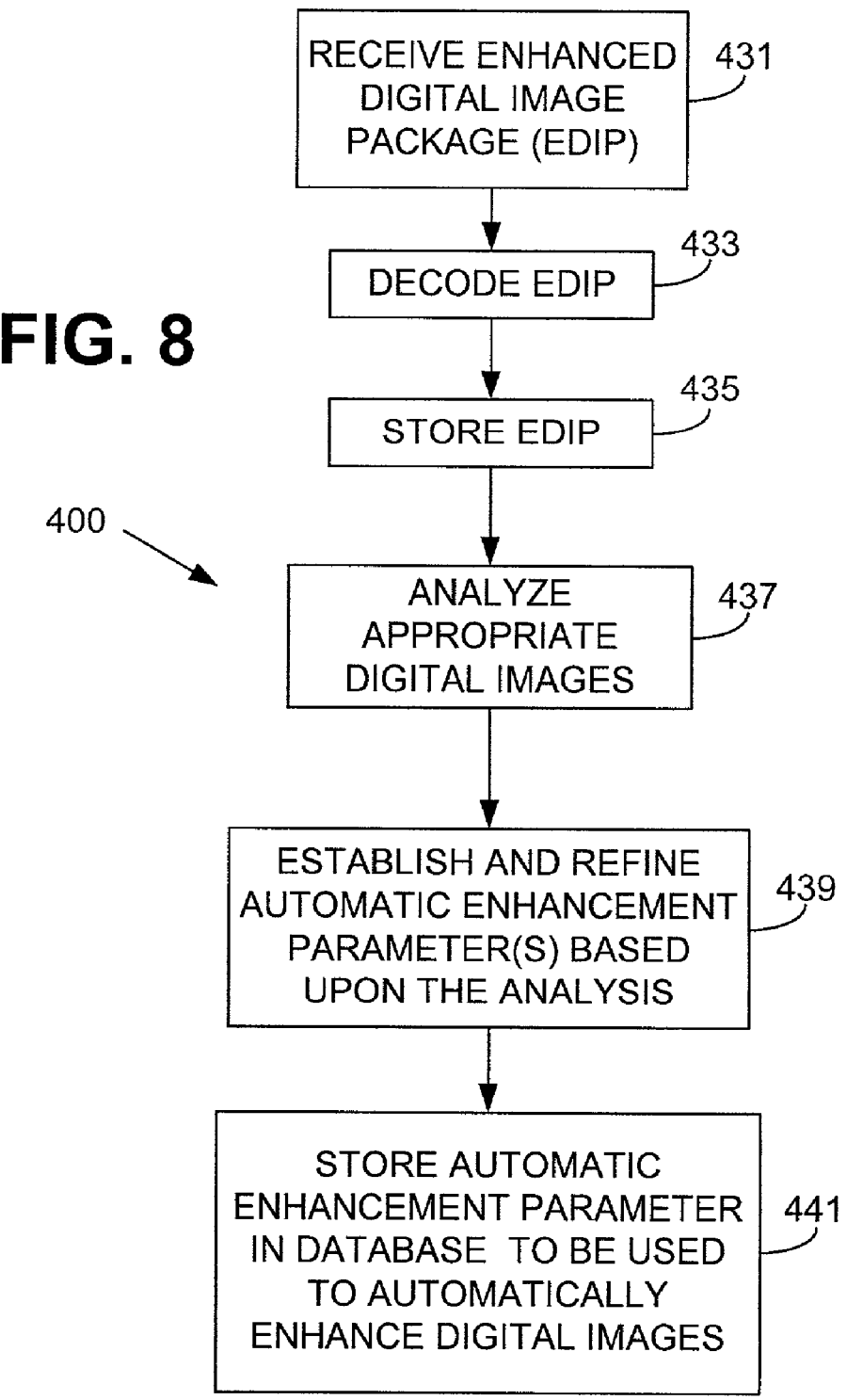
FIG. 8 is a flow chart of the automatic enhancement parameter creation module of the automatic digital image enhancement system shown in FIGS. 6 and 7.
Figure 9:
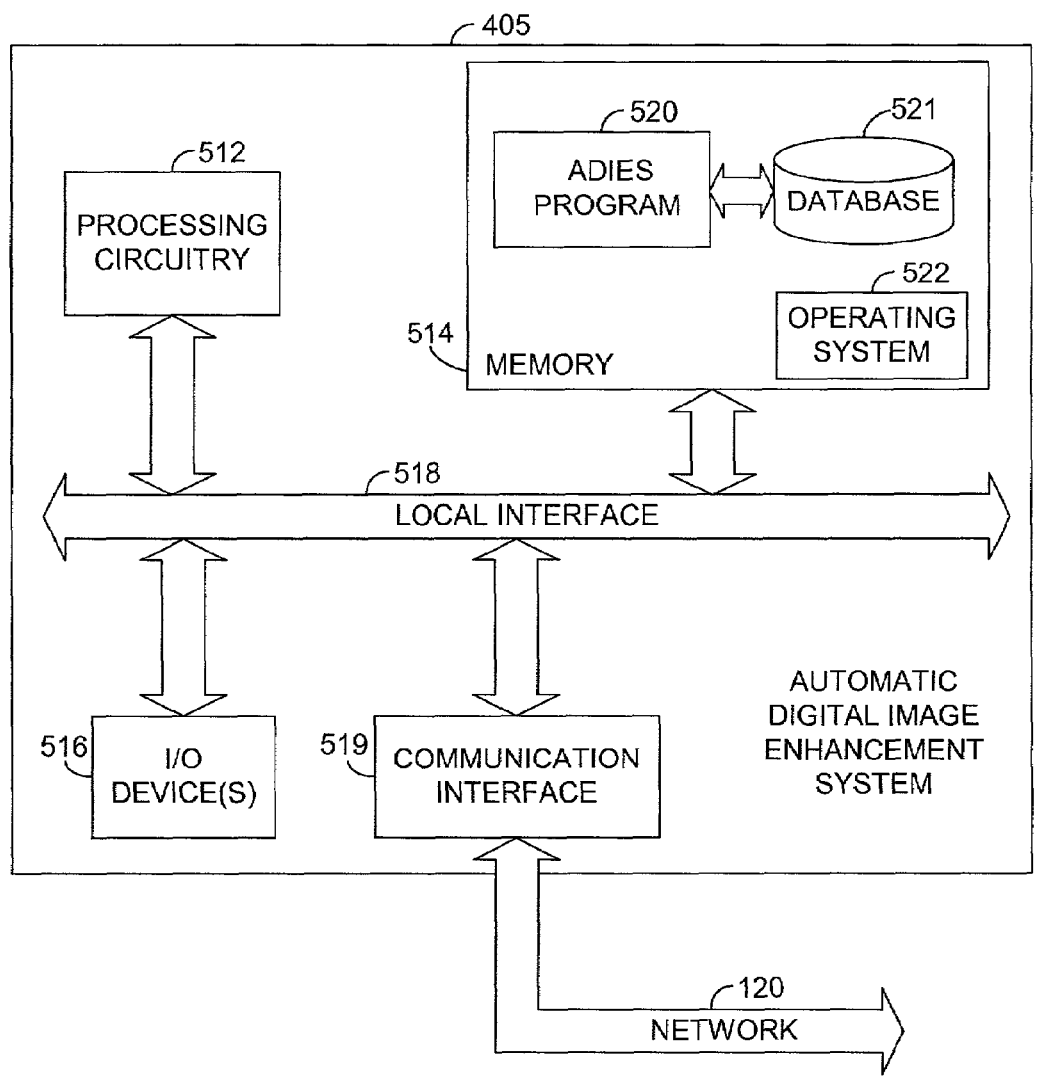
FIG. 9 is a block diagram of the remote digital image editor system shown in FIG. 4.

As illustrated in FIG. 7, the automatic digital image enhancement system 405 includes, but is not limited to, an automatic enhancement parameter creation module 407 (FIG. 8) and an automatic digital image editing system program 520 (FIGS. 9 and 10). The automatic enhancement parameter creation module 407 includes, but is not limited to, functions for establishing databases for original digital images, enhanced digital images, enhancements made to the original digital images, establishing one or more automatic enhancement parameters and refining the automatic enhancement parameters. Establishing the automatic enhancement parameter creation module 407 can include, but is not limited to, receiving an enhanced digital image package (EDIP), decoding the EDIP, analyzing one or more enhancements made to the original digital images and comparing those enhancements to the enhanced digital images, and establishing one or more automatic enhancement parameters based upon the analysis and comparison. The EDIP can include, but is not limited to, enhancements made manually or automatically to the digital images; editor notes such as comments regarding the enhancements made to one or more digital images, comments that a particular digital image should be added to the database because it would be helpful to other editors, and comments about how to enhance a particular digital image with certain enhancement challenges; etc. The automatic enhancement parameters can be refined by performing further analysis and comparisons to additional manual or automatically enhanced digital images, thereby creating an automatic digital image enhancement system 405 that is capable of improving the ability to enhance by continually refining one or more automatic enhancement parameters. After the automatic enhancement parameters are created, the automatic digital image enhancement system 405 can use one or more automatic enhancement parameters to automatically enhance digital images (FIGS. 9 and 10).

More particularly, an embodiment of the automatic enhancement parameter creation module 407, as shown in FIG. 8, functions to establish automatic enhancement parameters by analyzing and comparing original digital images with enhanced digital images and determining how and which features can be automatically enhanced using an automatic enhancement parameter. In other words, an editor enhances an original digital image. Then, the editor records the enhancements made to the original digital image. Thereafter, the automatic enhancement parameter creation module 407 acquires the original digital image, the enhanced digital image, the enhancements made to the original digital image, etc. and stores them in a database 521. Subsequently, the automatic enhancement parameter creation module 407 analyzes the stored information and establishes automatic enhancement parameters that can be used to enhance digital images that need similar enhancements.

Initially in FIG. 8, the automatic digital image enhancement system 405 receives the EDIP, as shown in block 431. Then, the automatic enhancement parameter creation module 407 decodes the EDIP, as shown in block 433. The EDIP can include, but is not limited to, original digital images, enhanced digital images, enhancements performed on digital images, the DIP, the CPP, etc. The decoding process can use stored information in the database 521 (FIG. 9) to determine the meaning of parameters of the CPP and can also be used to store the EDIP, as shown in block 433. After the EDIP is decoded and stored, the automatic enhancement parameter creation module 407 is capable of analyzing the original digital images, enhanced digital images, enhancements performed on digital images, and other needed information, as shown in block 437. In block 439, the automatic enhancement parameter creation module 407 is capable of establishing and refining one or more automatic enhancement parameters based upon the analysis. In block 441, the one or more automatic enhancement parameters are stored in database 521. Thereafter, one or more automatic enhancement parameters can be used to automatically enhance a digital image. The one or more automatic enhancement parameters can be refined as more digital images are enhanced. In other words, the automatic enhancement parameters can be refined each time new enhanced digital images are analyzed, so that a continual refining process is established.

An alternative embodiment for automatically enhancing a digital image would include automatically searching the database 521 for one or more similar digital images that have similar features as the digital image of interest. In this embodiment, the automatic digital image enhancement system 405 is capable of analyzing the one or more similar digital images and determining if the enhancements made to the one or more similar digital images should be performed on the digital image of interest. In this embodiment, automatic enhancement parameters can be determined from a small number of digital images stored in the database 521 and are selected for each digital image of interest based on the one or more similar digital images selected. This embodiment is different than the previous embodiment in that there is not a global set of automatic enhancement parameters to be applied to qualifying digital images.

In another embodiment, the automatic enhancement parameter creation module 407 is capable of creating one or more databases that include the original digital images, enhanced digital images, enhancements made to the original digital images, etc. The editor at the remote digital image editor system 305 can search the database to find similar digital images that have been previously enhanced and use the information in the database to provide assistance in enhancing other digital images. In addition, the editor can search the database for particular features present in the digital images (e.g. face, sky, building, etc.) that have been previously enhanced and use the information in the database to provide assistance in enhancing that particular feature in another digital image.

An embodiment of the automatic enhancement parameter creation module 407 that can be used to create and refine automatic enhancement parameters in the reference digital image database, is shown in FIG. 9. In an embodiment, the database includes a plurality of enhanced digital image category packets that include a plurality of digital images. The category packets include, for example, but are not limited to, people, nature, buildings, and other categories that function to group similar types of digital images. The category packets can be used to establish and refine automatic enhancement parameters by analyzing and comparing the original and enhanced digital images located in each category packet. In addition, the category packets can be accessed and used by editors located at remote digital image editor systems 305 to provide guidance in how to enhance digital images that are in a particular category type. A visual matching algorithm or other appropriate algorithm can be used to search the database to retrieve one or more appropriate digital images. The visual matching algorithm can search for features such as, but not limited to, flesh tones for the people category packet; sky features (e.g. blue sky, clouds, sun, etc.) for the nature category packet; buildings, roads, etc. for the buildings category packet; etc. The category packets can have sub-categories such as, for example, but not limited to, face or eyes in the people category. The category packets can be searched using keywords or by searching the category and/or sub-category packets manually.

The automatic digital image enhancement system 405 can be implemented in a computer system illustrated in FIG. 9 that is capable of communicatively coupling with the network 120. The automatic digital image enhancement system 405 includes an automatic digital image enhancement system program 520 (ADIES program) that can be implemented in software, firmware, hardware, or a combination thereof. The automatic digital image enhancement system 405 can be implemented in an executable program, and can be executed by a special or general purpose digital computer, such as a personal computer (PC; IBM-compatible, Apple-compatible, or otherwise), workstation, minicomputer, or mainframe computer. An example of a general purpose computer that can implement the automatic digital image enhancement system 405 of the remote digital image processing system 400 is shown in FIG. 9.

Generally, in terms of hardware architecture the automatic digital image enhancement system 405 includes a processor 512, memory 514, and one or more input and/or output (I/O) devices 516 that are communicatively coupled via a local interface 518. The local interface 518 can be, for example but not limited to, one or more buses or other wired or wireless connections, as is known in the art. The local interface 518 may have additional elements, which are omitted for simplicity, such as controllers, buffers (caches), drivers, repeaters, and receivers, to enable communications. Further, the local interface 518 may include address, control, and/or data connections to enable appropriate communications among the aforementioned components. The local interface 518 is communicatively coupled to a communication interface 519 that functions to communicatively couple with the network 120.

The processor 512 is a hardware device for executing software stored in memory 514. The processor 512 can be any custom made or commercially available processor, a central processing unit (CPU) or an auxiliary processor among several processors associated with the automatic digital image enhancement system 405, and a semiconductor based microprocessor (in the form of a microchip) or a macroprocessor. Examples of suitable commercially available microprocessors includes: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 514 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 514 may incorporate electronic, magnetic, optical, and/or other types of storage media. Note that the memory 514 can have a distributed architecture, where various components are situated remote from one another, but can be accessed by the processor 512.

The software in memory 514 may include one or more separate programs, each of which comprises an ordered listing of executable instructions for implementing logical functions. In the example of FIG. 8, the software in the memory 514 includes, but is not limited to, an automatic digital image enhancement system program 520 (hereinafter ADIES program 520), ADIES program 520, a database 521, and a suitable operating system (O/S) 522. A nonexhaustive list of examples of suitable commercially available operating systems 522 is as follows: a Windows™ operating system from Microsoft Corporation, a Netware™ operating system available from Novell, Inc., or a UNIX™ operating system, which is available for purchase from many vendors, such as Hewlett-Packard Company, Sun Microsystems, Inc., and AT&T Corporation. The operating system 522 essentially controls the execution of other computer programs, such as the ADIES program 520, and provides scheduling, input-output control, file and data management, memory management, and communication control and related services.

The ADIES program 520 can be a source program, executable program (object code), script, or any other entity comprising a set of instructions to be performed. When a source program, then the program needs to be translated via a compiler, assembler, interpreter, or the like, which may or may not be included within the memory 514, so as to operate properly in connection with the O/S 522. Furthermore, the ADIES program 520 can be written as an object oriented programming language, which has classes of data and methods, or a procedure programming language, which has routines, subroutines, and/or functions, for example but not limited to, C, C++, Pascal, Basic, Fortran, Cobol, Perl, Java, and Ada.

The I/O devices 516 may include input devices, for example but not limited to, a keyboard, mouse, scanner, microphone, etc. Furthermore, the I/O devices 516 may also include output devices, for example but not limited to, a printer, display, etc. The communication interface 519 may include devices that communicate both inputs and outputs, for instance but not limited to, a modulator/demodulator (modem; for accessing another device, system, or network), a radio frequency (RE) or other transceiver, a telephonic interface, a bridge, a router, etc.

If the automatic digital image enhancement system 405 is a PC, workstation, or the like, the software in the memory 514 may further include a basic input output system (BIOS) (omitted for simplicity). The BIOS is a set of essential software routines that initialize and test hardware at startup, start the O/S 522, and support the transfer of data among the hardware devices. The BIOS is stored in ROM so that the BIOS can be executed when the automatic digital image enhancement system 405 is activated.

When the automatic digital image enhancement system 405 is in operation, the processor 512 is configured to execute software stored within the memory 514, to communicate data to and from the memory 514, and to generally control operations of the automatic digital image enhancement system 405 pursuant to the software. The ADIES program 520 and the O/S 522, in whole or in part, but typically the latter, are read by the processor 512, perhaps buffered within the processor 512, and then executed.

When the ADIES program 520 are implemented in software, as is shown in FIG. 8, it should be noted that the ADIES program 520 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The ADIES program 520 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ADIES program 520 can be implemented in hardware, the ADIES program 520 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Generally, the ADIES program 520 is designed to implement functions for receiving a DIP, decoding the DIP, determining the automatic enhancement to be performed based upon the CPP, and performing the enhancement of the digital images (e.g. default enhancement or CPP based enhancement), etc. The ADIES program 520 is capable of using one or more editing programs to enhance digital images such as, for example, but not limited to, visual matching programs, face detection programs, or other appropriate programs. FIG. 10 illustrates a flow chart of an embodiment of the ADIES program 520. Initially, the ADIES program 520 of the automatic digital image enhancement system 405 receives the DIP, as shown in block 531. Then, the ADIES program 520 decodes the DIP, as shown in block 533. Through decoding, the ADIES program 520 is capable of determining if the DIP includes parameters such as, but not limited to, the CPP, one or more digital images, etc. The decoding process can use stored information in the database 521 to determine the meaning of the DIP and CPP. After the DIP is decoded, the ADIES program 520 determines, as shown in decisional block 535, if the DIP includes a CPP. If the determination in block 535 is "no," then the ADIES program 520 automatically enhances the digital image using default automatic enhancement parameters, as shown in block 537. The default automatic enhancement parameters function to provide directions to automatically enhance digital images for basic digital image problems. More particularly, the default automatic enhancement parameters can include, but are not limited to, enhancing the digital image by correcting for red-eye, sharpness, color, off-center, or crooked and enhancing the digital image by lightening underexposed digital images, darkening overexposed digital images, removing flash reflections, or removing background distractions, etc. Alternatively, the ADIES program 520 is capable of requesting that the digital image packet sender select appropriate customer preference parameters that include instructions of how to automatically enhance the digital images.

If the determination in block 535 is "yes," then the digital images are automatically enhanced based upon the CPP, as shown in block 539. The automatic enhancement based upon the CPP can include, but is not limited to, parameters that indicate instructions for one or more automatic enhancements to be performed on all digital images, parameters that indicate instructions for one or more automatic enhancements to be performed on one or more particular digital images, etc. Further, the automatic enhancement based upon the CPP can include, but are not limited to, enhancing the digital image by correcting for red-eye, sharpness, color, off-center, or crooked and enhancing the digital image by lightening underexposed digital images, darkening overexposed digital images, removing flash reflections, or removing background distractions, etc.

After one or more digital images are automatically enhanced, as shown in block 539, the ADIES program 520 sends the automatically enhanced digital image packet to the remote editor, sender, or other appropriate party, as shown in block 541. The preferred embodiment would be configured to transmit the automatically enhanced digital image packet to the remote digital image editor system 305, where the editor can determine if the automatic enhancements are appropriate.

In addition, the ADIES program 520 sends enhanced digital image packets to the automatic digital image enhancement system 405, as shown in block 543. The automatic digital image enhancement system 405 receives and stores the enhanced digital image packet, as shown in block 545. Thereafter, the automatic digital image enhancement system 405 analyzes the original digital image, enhanced digital image, the enhanced features of the enhanced digital image, etc, as shown in block 547. After analysis, the automatic digital image enhancement system establishes and/or refines one or more automatic enhancement parameters to be used in subsequent automatic enhancement of digital images by the automatic digital image enhancement system 405, as shown in block 549. Thereafter, the established and/or refined automatic enhancement parameters can be used for the automatic enhancement of subsequent digital images, as shown in blocks 537 and 539. The automatic digital image enhancement system 405 may be included in the digital image routing system 205, remote digital image editor system 305, or a combination of both.

Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A digital image enhancement system, comprising:
  means for receiving a digital image packet directly from a customer via a network, wherein the digital image packet includes a digital image from a digital camera and a customer preference parameter;
  means for selecting a remote digital image editing system according to the customer preference parameter;
  means for transmitting the digital image packet to the selected remote digital image editing system;
  means for enhancing the digital image at the selected remote digital image editing system based on the customer preference parameter; and
  means for transmitting an enhanced digital image packet to the customer via the network, wherein the enhanced digital image packet includes an enhanced digital image and an enhancement description packet that describes the enhancements made for each of the digital images.

2. The digital image enhancement system of claim 1, wherein the means for enhancing the digital image, includes means for automatically enhancing the digital image based on the customer preference parameter.

3. A digital image enhancement method, comprising the steps of:
  receiving a digital image packet directly from a customer via a network, wherein the digital image packet includes a digital image from a digital camera and a customer preference parameter;
  selecting a remote digital image editing system according to the customer preference parameter;
  transmitting the digital image packet to the selected remote digital image editing system;
  enhancing the digital image at the selected remote digital image editing system based on the customer preference parameter; and
  transmitting an enhanced digital image packet to the customer via the network, wherein the enhanced digital image packet includes an enhanced digital image and an enhancement description packet that describes the enhancements made for each of the digital images.

4. The digital image enhancement method of claim 3, wherein the step of enhancing the digital image, includes enhancing the digital image automatically based upon the customer preference parameter.

5. The digital image enhancement method of claim 3, further comprising the step of enhancing the digital image automatically using an automatic digital image enhancement system.

6. The digital image enhancement method of claim 5, further comprises the steps of:
  storing an enhancement performed on a previous digital image;
  analyzing the exhancement performed on the previous digital image; and
  establishing the enhancement parameter to be used by the automatic digital image enhancement system to automatically enhance the digital image.

* * * * *

UNITED STATES PATENT AND TRADEMARK OFFICE
CERTIFICATE OF CORRECTION

PATENT NO. : 7,269,303 B2
APPLICATION NO. : 09/873222
DATED : September 11, 2007
INVENTOR(S) : David Jeffrey Miller et al.

It is certified that error appears in the above-identified patent and that said Letters Patent is hereby corrected as shown below:

In column 15, line 28, delete "(RE)" and insert -- (RF) --, therefor.

In column 18, line 49, in Claim 6, delete "exhancement" and insert -- enhancement --, therefor.

Signed and Sealed this

First Day of July, 2008

JON W. DUDAS
*Director of the United States Patent and Trademark Office*